United States Patent
Lee et al.

(10) Patent No.: US 7,111,525 B2
(45) Date of Patent: Sep. 26, 2006

(54) CRANK SHAFT

(75) Inventors: In Won Lee, Seoul (KR); Kwang Hyup An, Seoul (KR); Jeong Ho Lee, Goyang-si (KR); In Seop Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/186,675

(22) Filed: Jul. 2, 2002

(65) Prior Publication Data
US 2004/0040412 A1    Mar. 4, 2004

(30) Foreign Application Priority Data
Feb. 28, 2002    (KR) ................ 2001-10993

(51) Int. Cl.
*F16C 11/00*    (2006.01)
(52) U.S. Cl. ........................... 74/599; 74/604
(58) Field of Classification Search ............ 74/586, 74/594.3, 595, 596, 597, 598, 599, 600, 601, 74/602, 603, 604, 574, 573
See application file for complete search history.

(56) References Cited

U.S. PATENT DOCUMENTS

| | | | |
|---|---|---|---|
| 157,765 A * | 12/1874 | Ruggles | 74/602 |
| 589,728 A * | 9/1897 | James | 74/594.3 |
| 676,629 A * | 6/1901 | Moore | 74/594.3 |
| 1,349,094 A * | 8/1920 | Owen | 74/44 |
| 1,872,763 A * | 8/1932 | Lee | 74/604 |
| 2,287,472 A * | 6/1942 | Eby | 74/602 |
| 2,699,119 A * | 1/1955 | Healey | 74/834 |
| 3,301,557 A * | 1/1967 | Rogers | 74/602 |
| 3,496,874 A * | 2/1970 | Findlay | 417/383 |
| 4,301,695 A * | 11/1981 | Reiher | 74/602 |
| 4,319,498 A * | 3/1982 | McWhorter | 74/595 |
| 4,467,756 A * | 8/1984 | McWhorter | 74/595 |
| 4,622,793 A * | 11/1986 | Oki | 74/600 |
| 5,681,155 A * | 10/1997 | Hisanaga et al. | 418/14 |
| 6,253,639 B1 * | 7/2001 | Richardson | 74/594.3 |

\* cited by examiner

*Primary Examiner*—David Fenstermacher
(74) *Attorney, Agent, or Firm*—Birch, Stewart, Kolasch & Birch, LLP

(57) ABSTRACT

The invention relates to a crank shaft having a guide groove allowing the movement of a crank pin so as to adjust the reciprocating distance of a piston according to the rotating direction. The crank shaft comprises a rotation shaft for inducing the rotating movement; and a crank arm connected to the rotation shaft at the center and having at one side a guide groove provided horizontal in the radial direction for allowing free movement of a crank pin and elastic means provided within the guide groove to enhance the performance of sucking and compressing fluid.

Accordingly, smooth and soft compression is enabled to prevent the overpressure loss. Also, the sucking performance is improved by using additional retreat due to the elastic means.

13 Claims, 7 Drawing Sheets

- - - - Piston of Conventional Reciprocating Compressor

——— Piston of Reciprocating Compressor Adopting Crank Shaft According to the Invention

CRANK SHAFT

BACKGROUND OF THE INVENTION

1. Field of the Invention

The present invention relates to a crank shaft, in particular, capable of improving the conversion efficiency between rotational movement and linear movement by using an elastic member.

2. Description of the Related Art

In general, a crank shaft is widely used for an engine of a vehicle, a compressor and the like functioning as a member for converting rotational movement into reciprocating movement.

FIG. 1 illustrates the structure of a conventional crank shaft.

Referring to FIG. 1, the conventional crank shaft comprises: a rotation shaft 30 connected to a rotation member 10 for rotating the rotation shaft 30; and a crank arm 40 which is connected at the center to the rotation shaft 30 and at one side to a connecting rod via a crank pin 50. At one end of the connecting rod 60, is provided a reciprocation member 20 moving according to the reciprocating movement of the connecting rod.

To be more specific, the rotation member 10 rotates the rotation shaft 30, in which the rotation of the rotation shaft 30 is directly transferred to the crank arm 40 rotating the same. In this case, the crank pin 50 is biased from the center of gyration of the crank arm 40 for a predetermine distance to rotate in a circle having a predetermined radius due to the rotation of the rotation shaft 30.

The connecting rod 60 connected to the crank pin 50 converts the circular movement of the crank pin 50 into vertical reciprocating movement. The vertical movement of the connecting rod 60 vertically moves the reciprocation member 20 connected thereto.

Alternatively, the operation can be carried out reversely from the above. In other words, the reciprocation member 20 is operated to vertically reciprocate the connecting rod 60 connected thereto. The connecting rod 60 circularly moves the crank arm 40 accordingly rotating the rotation shaft 30 so that the rotation member 10 connected to the rotation shaft 30 performs a certain operation.

The crank shaft is the member capable of converting the rotational movement into the reciprocating movement. Such a crank shaft is generally used in the modern society. For example, a vehicular engine rotates the rotation member due to the reciprocating movement of the reciprocation member. On the contrary, the rotation of the rotation member makes the reciprocation member reciprocate in a compressor used for a refrigerator or an air conditioner.

FIG. 2 illustrates the structure of a reciprocating compressor adopting a conventional crank shaft.

Referring to FIG. 2, the conventional reciprocating compressor comprises a closed vessel 1 defining a housing of the compressor, a frame 2 installed inside the closed vessel 1, a drive motor M constituted of a stator 3 and a rotor 4 installed under the frame 2, a crank shaft 30 coupled to the inside diameter of the rotor 4 of the drive motor M and having an eccentric section at one end, a connecting rod 60 connected to both of the eccentric section of the crank shaft 30 and the lower end of a piston 22 for converting the turning effect of the crank shaft 30 into linear reciprocating movement, a cylinder 21 coupled to an upper portion of the frame 2 and the piston 22, in which the piston 22 is connected to the connecting rod 60 coupled to the eccentric section of the crank shaft 30 to linearly reciprocate within the cylinder 21.

Here, the one side of the crank shaft 30 is fixedly connected to the connecting rod 60 through a crank pin.

The cylinder 21 is provided with suction and discharge valves for sucking and discharging a coolant gas into/from the cylinder 21, in which the valves are surrounded by a muffler 8.

Describing the operation of the reciprocating compressor configured as above, operation of the drive motor M primarily rotates the crank shaft 5, and accordingly the connecting rod 60 performs circular movement also. Since the connecting rod 60 is connected to the piston 22 placed inside the cylinder 21, the circular movement of the connecting rod 60 allows the piston 22 to perform linear reciprocating movement. The reciprocating movement of the piston 22 is used to suck, compress and discharge fluid.

However, since the conventional crank shaft has the crank pin fixed to the connecting rod, the loss according to overpressure is generated in the compression process as the rotation force of the crank shaft is transferred to the connecting rod as it is. Also, in case of the sucking process, the maximum efficiency of the conventional reciprocating compressor is decreased as the piston connected with the crank shaft through the connecting rod sucks the coolant less than the maximum sucking volume.

SUMMARY OF THE INVENTION

Accordingly, the present invention has been made to solve the above problems and it is an object of the invention to provide a crank shaft capable of improving the performance of compressing and sucking fluid by using a crank arm having a guide groove with elastic members installed therein.

According to a preferred aspect of the invention to obtain the above objects, it is provided a crank shaft for converting rotating movement into reciprocating movement, comprising: a rotation shaft for inducing the rotating movement; and a crank arm connected to the rotation shaft at the center and having at one side a guide groove for allowing free movement of a crank pin.

In the crank shaft, the guide groove may be horizontally provided leading from the first point on the inner circle to the second point on the outer circle. In addition, the crank shaft may further comprise elastic means for elastic support provided at both sides of the crank pin within the horizontal guide groove.

According to another preferred aspect of the invention to obtain the above objects, it is provided a crank shaft for converting rotating movement into reciprocating movement, comprising: a rotation shaft for inducing the rotating movement; a crank arm connected to the rotation shaft at the center and having a guide groove at one side; and a crank pin freely movable in the guide groove.

According to further another preferred aspect of the invention to obtain the above objects, it is provided a crank shaft for converting rotating movement into reciprocating movement, comprising: a rotation shaft for inducing the rotating movement; a crank arm connected to the rotation shaft at the center and having a guide groove at one side, the guide groove horizontally leading from a first point on an inner circle to a second point on an outer circle; and a crank pin freely movable in the guide groove.

The crank shaft may further comprise elastic means for elastic support provided at both sides of the crank pin in the horizontal guide groove.

According to further another preferred aspect of the invention to obtain the above objects, it is provided a reciprocating compressor comprising: a motor for creating rotating movement; a crank shaft which has a rotation shaft fixedly provided in the center of the crank shaft and connected to the motor, a guide groove horizontally provided leading from an inner circle to an outer circle placed at distances from the center, elastic means for elastic support in the guide groove and a crank pin freely movable in the guide groove according to the rotating direction; a piston connected to the crank pin with an interval via a connecting rod to perform linear reciprocating movement; and a cylinder having an internal space for sucking and compressing fluid according to the linear reciprocating movement of the piston.

In the reciprocating compressor, the elastic means are preferably provided at both sides of the crank pin.

In the reciprocating compressor, the crank pin is pushed outward in the guide groove while the piston moves from the lowest point to the highest point.

In the reciprocating compressor, the crank pin is pushed inward in the guide groove while the piston moves from the highest point to the lowest point.

DETAILED DESCRIPTION OF THE PREFERRED EMBODIMENT

The following detailed description will present preferred embodiments of the invention in reference to the accompanying drawings.

Figure 1:
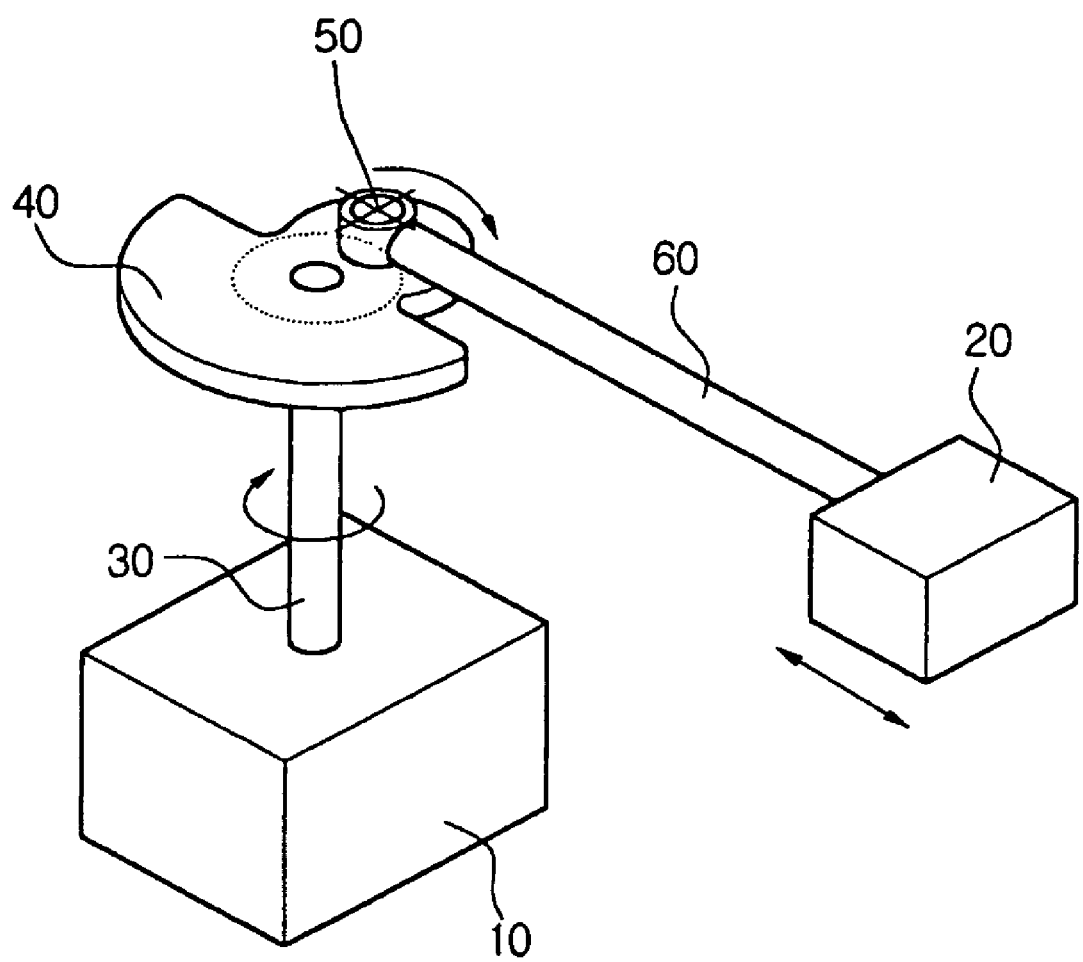
FIG. 1 illustrates the structure of a conventional crank shaft.
Figure 2:
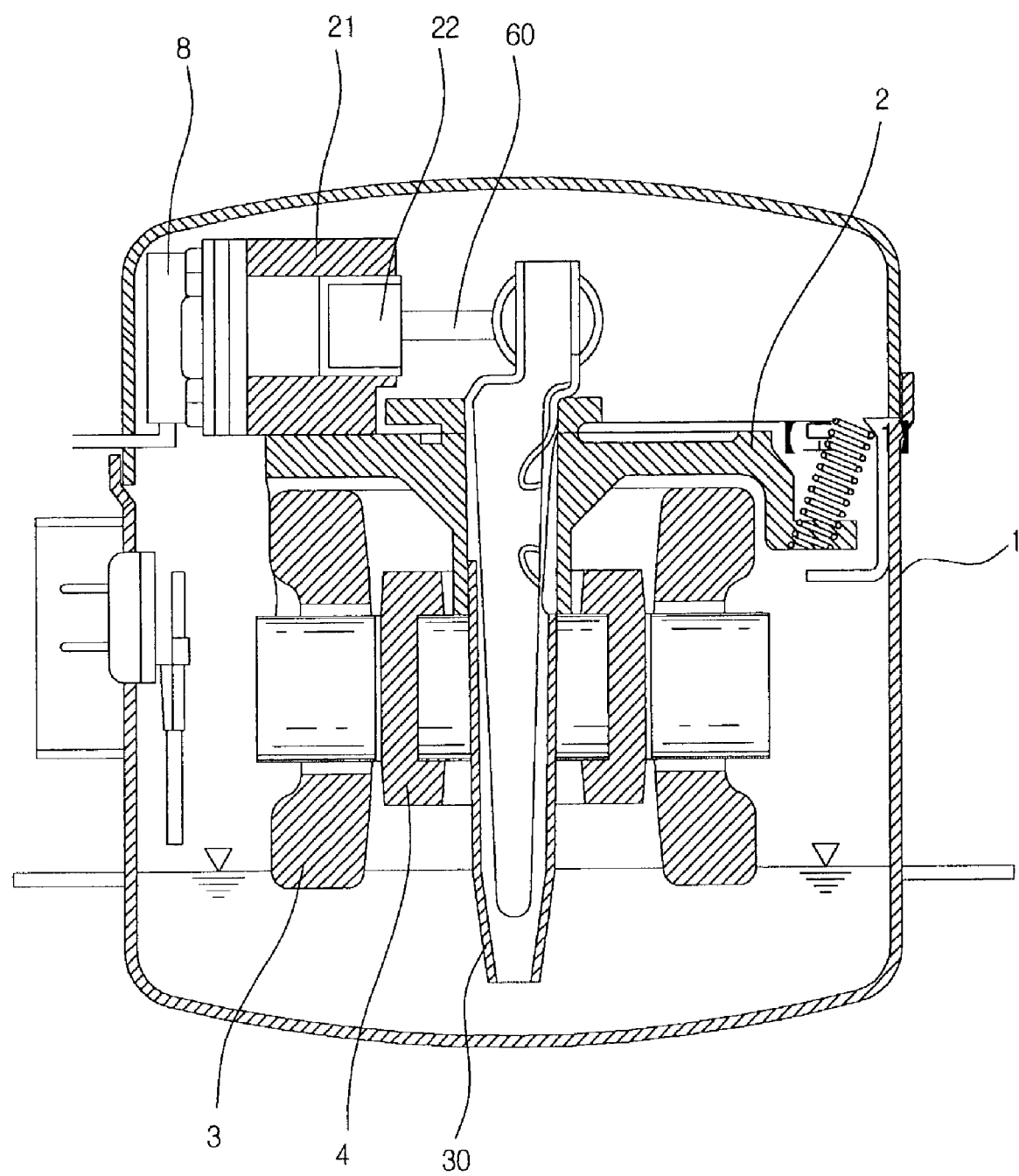
FIG. 2 illustrates the structure of a reciprocating compressor adopting a conventional crank shaft.
Figure 3A:
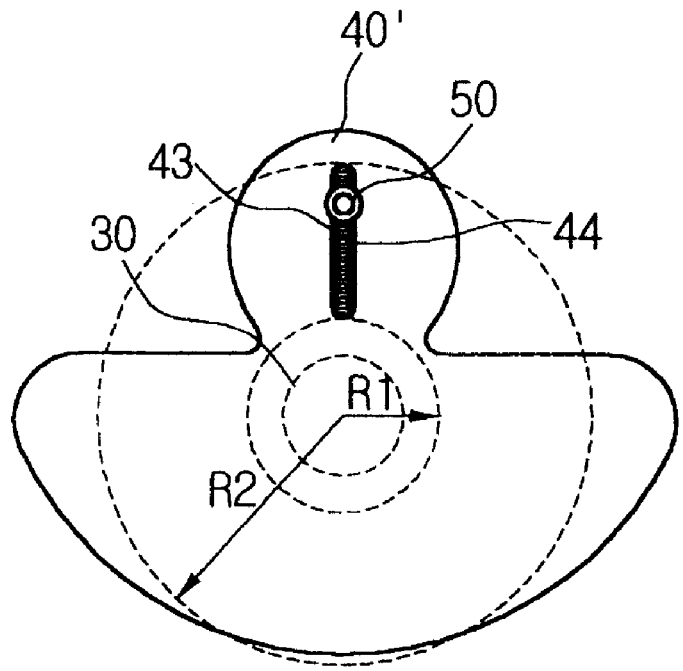
FIGS. 3A and 3B illustrate the structure of a crank shaft according to the third preferred embodiment of the invention.
Figure 3B:
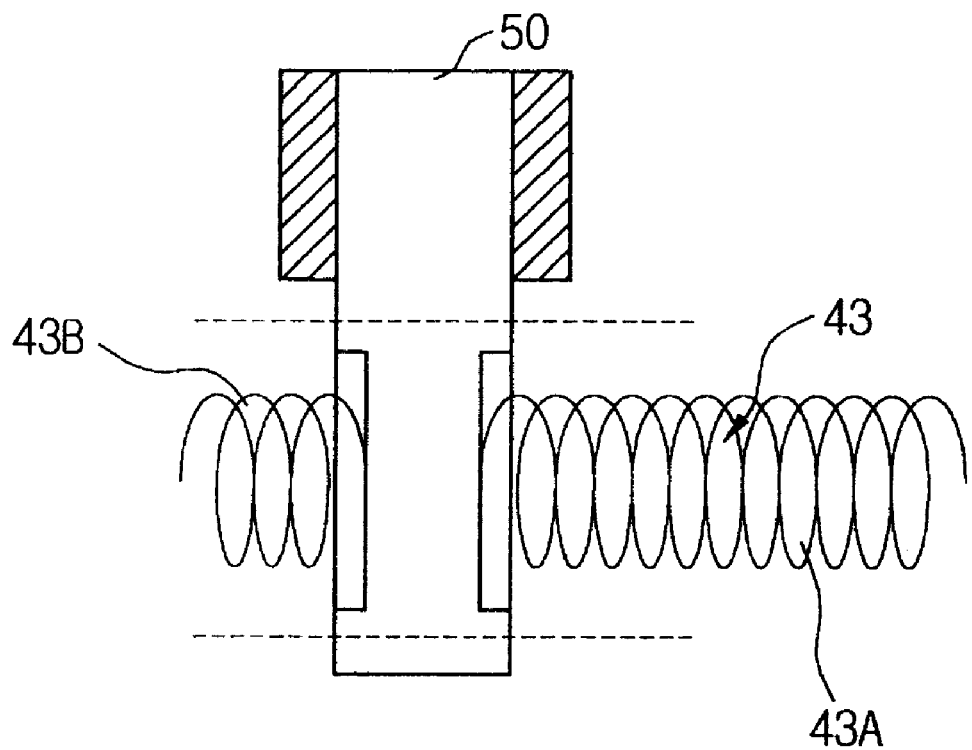

FIGS. 3A and 3B illustrate the structure of a crank shaft according to the third preferred embodiment of the invention;

Referring to FIGS. 3A and 3B, the crank shaft is connected at its center to a rotation shaft 30 for inducing rotating movement. Further, separate from the rotation shaft 30, a guide groove 44 is provided at one side of the crank arm 40' to allow a crank pin 50 to move freely. At both sides of the crank pin 50 in the guide groove 44, are provided elastic means 43 for elastically supporting the crank pin 50. Preferably, the elastic means 43 are provided as springs.

Further, the guide groove 44 is horizontally formed leading from a point on an inner circle having a radius R1 to a point on an outer circle having a radius R2, i.e., the guide groove 44 is formed as a straight line outwardly leading from the point on the inner circle having the radius R1 to the point on the outer circle having the radius R2.

Preferably, the crank pin 50 is biased as outwardly as possible by the elastic means functioning as a member capable of freely moving in the guide groove 44. As shown in FIG. 8B, the elastic means 43 are divided into two for this purpose, in which first elastic means 43A is preferably longer than the second elastic means 43B. To be specific, the first elastic means 43A has a length from the point of the guide groove 44 contacting the inner circle having the radius R1 to a point contacting the crank pin 50. The second elastic means 43B has a length from the crank pin 50 to the point of the guide groove 44 contacting the outer circle having the radius R2. Therefore, the first elastic means 43A is longer than the second elastic means 43B so that the crank pin 50 can be biased outward.

Figure 4:
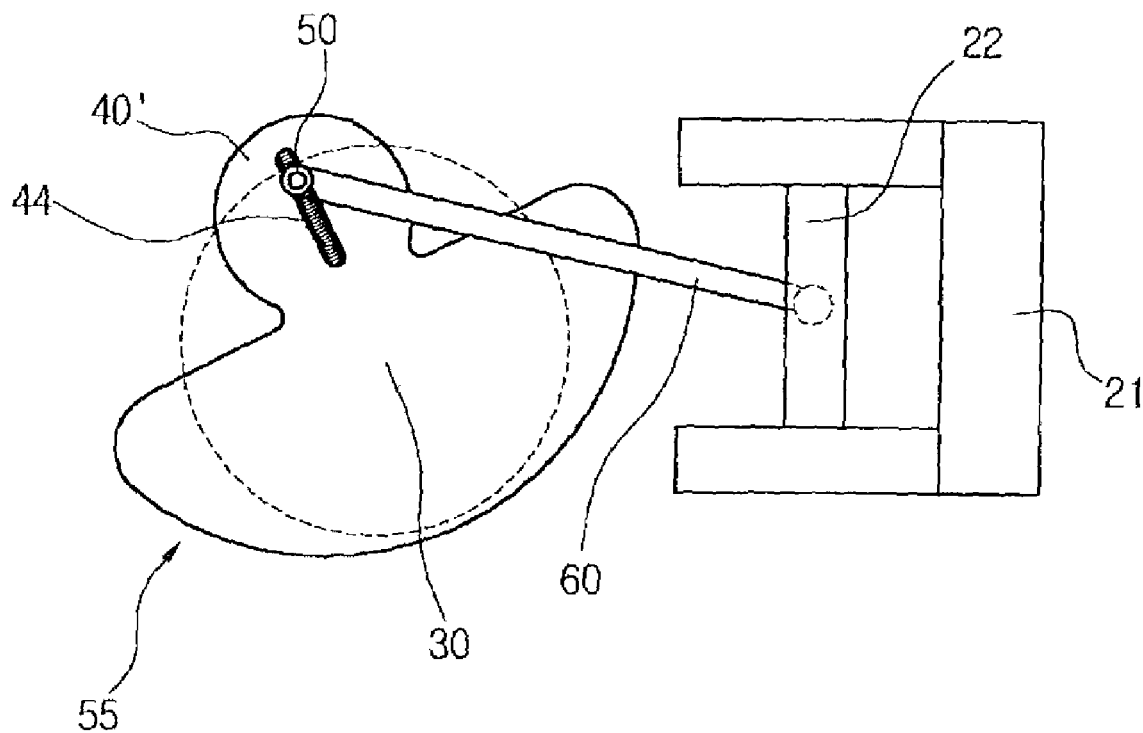
FIG. 4 schematically illustrates the structure of a reciprocating compressor adopting the crank shaft according to the third preferred embodiment of the invention.
Figure 5A:
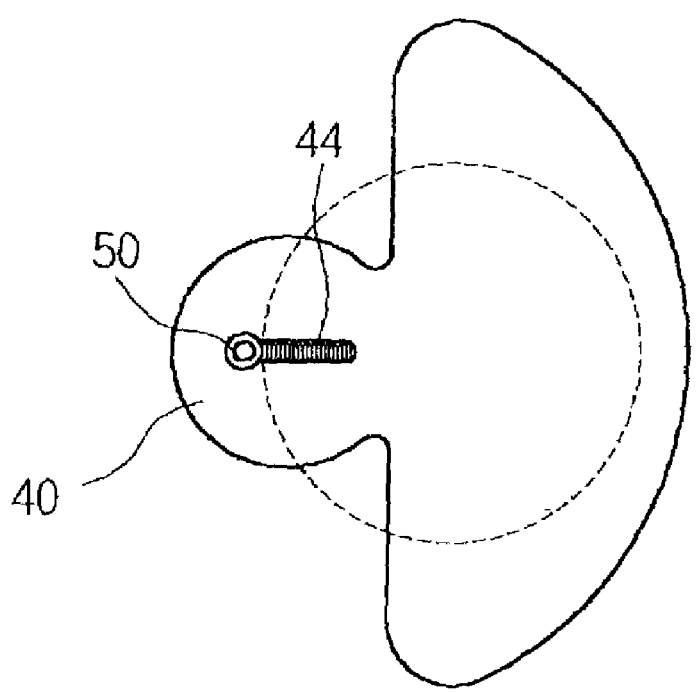
FIGS. 5A–5D schematically illustrate the operation of the reciprocating compressor adopting the crank shaft according to the third preferred embodiment of the invention.
Figure 5B:
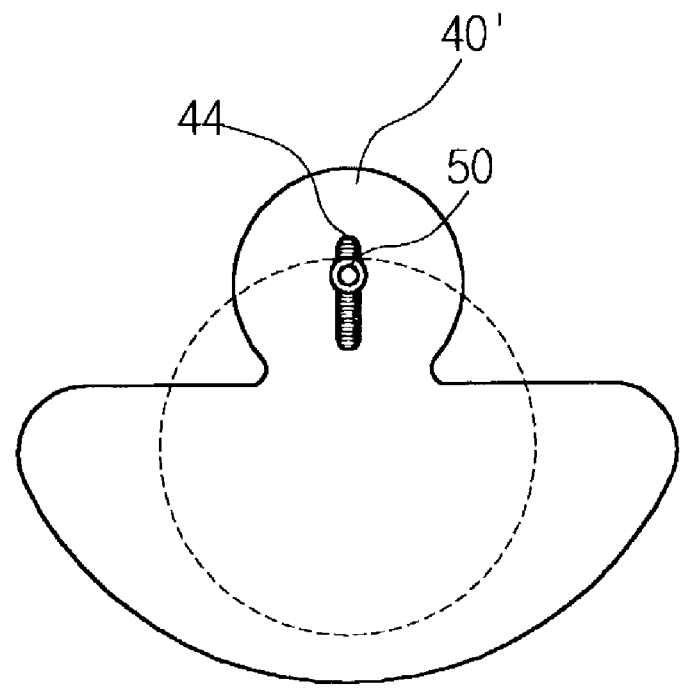
Figure 5C:
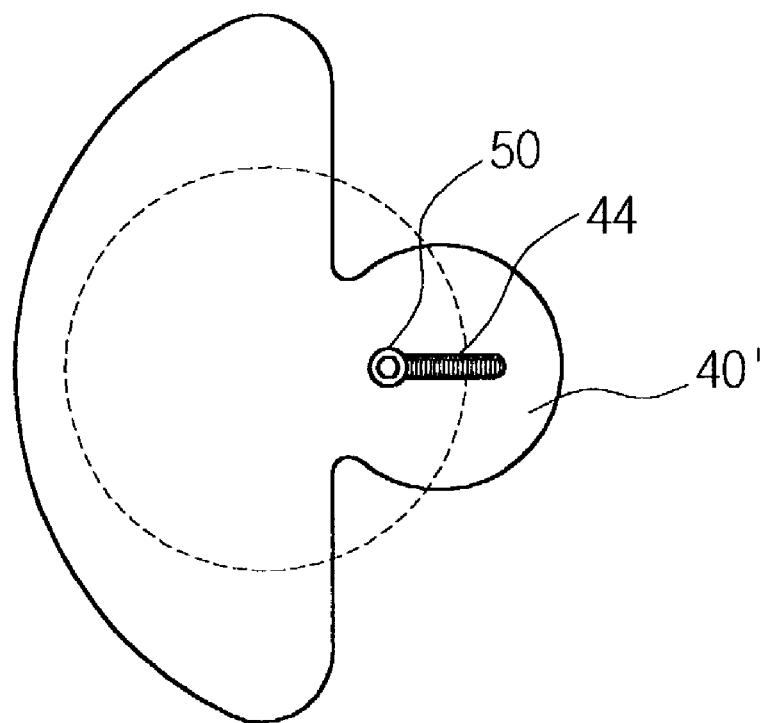
Figure 5D:
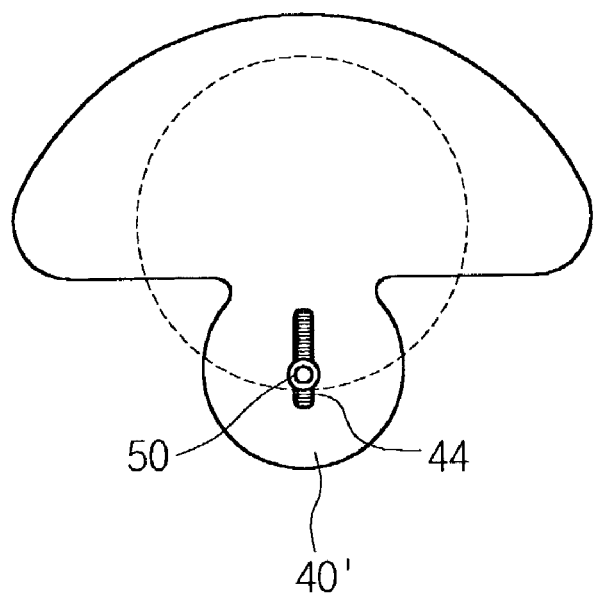

FIG. 4 schematically illustrates the structure of the reciprocating compressor adopting the crank shaft according to the third preferred embodiment of the invention.

Referring to FIG. 4, the reciprocating compressor has the connecting rod 60 connected to the crank pin 50 of the crank shaft 55 and the piston 22 connected to the end of the connecting rod 60. The piston 22 sucks and compresses fluid while reciprocating within the cylinder 21.

The operation of the reciprocating compressor will be described as follows in reference to FIGS. 5A–5D. First, when the crank pin 50 is placed antipodal to the cylinder, i.e. at the position of the highest point, the crank pin 50 is outwardly placed due to the elasticity of the elastic means in the guide groove 44, and further biased outward due to a centrifugal force generated under rotation.

In sequence, when the crank shaft is further rotated so that the formed direction of the guide groove 44 is perpendicular to the reciprocating direction of the piston, the fluid introduced into the cylinder is compressed to repel the crank pin 50. Then, the outward and inward directions of the guide groove 44 are exchanged so that the crank pin 50 is pushed inward in the guide groove 44. To be specific, the outward direction of the guide groove 44 is directed toward the piston and the inward direction of the guide groove 44 is directed opposite to the piston so that the crank pin 50 is pushed inward in the guide groove 44 under the pressure applied to the piston from the fluid. However, such pushing smoothly takes place by the elastic means supporting the crank pin 50 in the guide groove 44 thereby resulting in uniform processes of compressing and discharging the fluid in the cylinder. Of course, considering the efficiency of compression, a preceding process is required to previously install the cylinder near the crank shaft so that the piston can reach the lowest point when the crank pin 50 is completely pushed inward.

The compressing and discharging processes take place when the piston is positioned at the lowest point. When the piston passes by the lowest point, the pressure applied to the crank pin 50 decreases also so that the crank pin is gradually pushed outward due to the elastic means 43 and the centrifugal force. Such a phenomenon is at the supreme near the highest point, where the crank pin is rapidly pushed outward. This phenomenon means that the piston rapidly retreats in the cylinder so as to suck a larger amount of fluid into the cylinder.

In this case, the lowest point indicates that the crank pin is positioned between the crank shaft and the cylinder, and the highest point indicates that the crank pin is positioned opposite to the cylinder in respect to the crank shaft.

Figure 6:
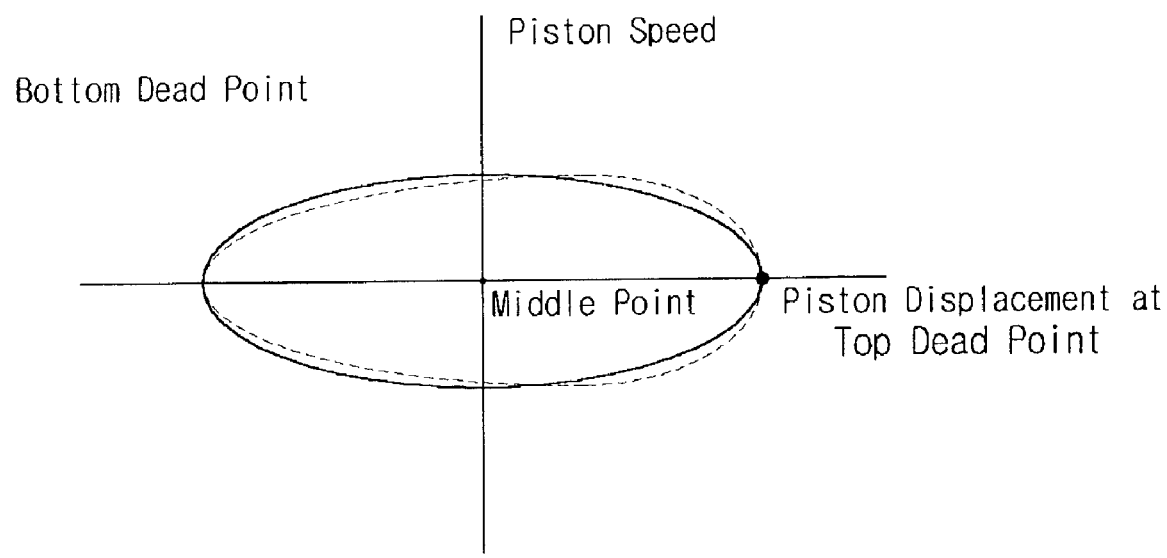
FIG. 6 illustrates the operation of a piston due to the rotation of the crank shaft according to the third preferred embodiment of the invention.

Describing the operation of the piston due to the rotation of the crank shaft in reference to FIG. 6, it can be seen that the speed of the piston rapidly rises up to a middle point and then suddenly drops at the highest point under the repulsive pressure as the fluid is compressed. Such a phenomenon incurs unbalanced discharging rate resulting in overpressure loss.

In the reciprocating compressor according to the third preferred embodiment of the invention, the speed of the piston is smoothly varied due to the operation of the elastic means when the fluid is compressed so that the fluid is uniformly compressed to avoid the overpressure loss unlike in the related art.

Further, the elastic means vary the piston speed more rapidly than in the related art in the vicinity of the highest point thereby increasing the amount of fluid suction.

Hereinafter description will be made about the position of the piston in the crank shaft according to the third preferred embodiment of the invention in comparison with that of the related art.

Figure 7:
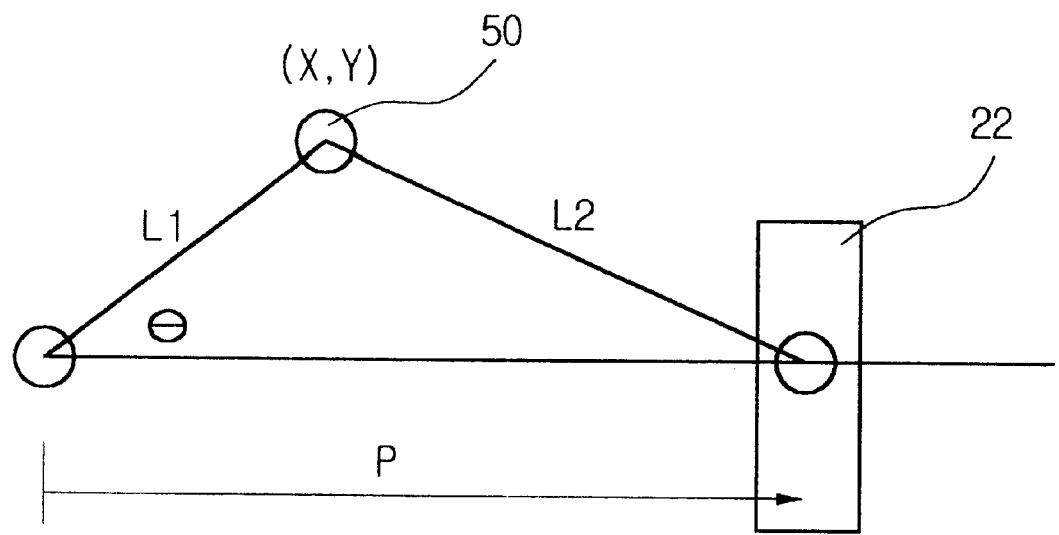
FIG. 7 illustrates the position of a piston in a conventional crank shaft.
Figure 8:
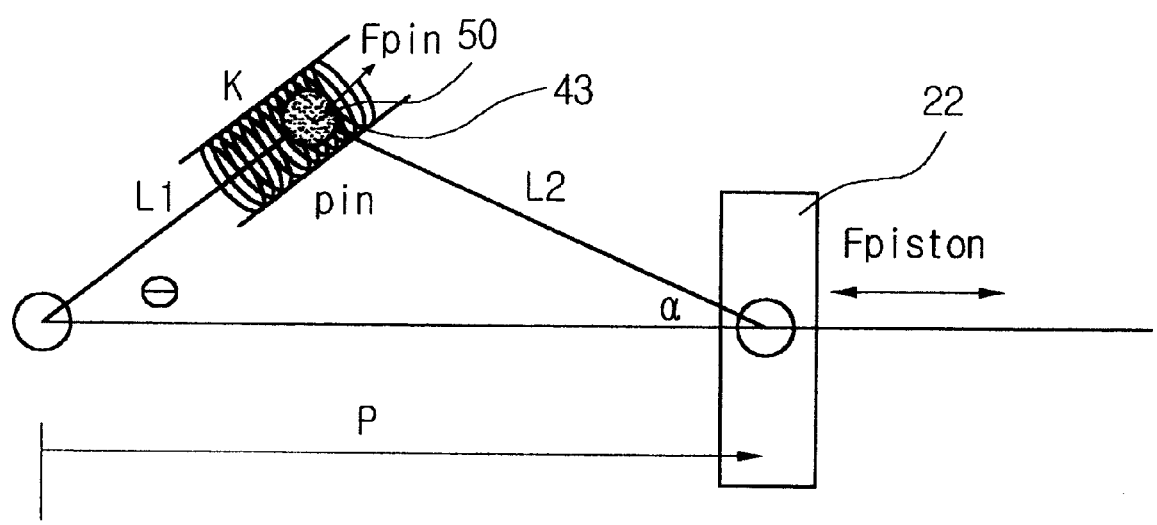
FIG. 8 illustrates the position of a piston in the crank shaft according to the third preferred embodiment of the invention.

FIG. 7 illustrates the position of a piston in a convention crank shaft, and FIG. 8 illustrates the position of a piston in the crank shaft according to the third preferred embodiment of the invention.

Referring to FIG. 7, it can be seen that the piston 22 linearly reciprocates as a crank pin 50 is rotated under the rotation of the crank shaft, i.e. as the crank shaft is rotated to be more specific. In this case, the position P of the piston 22 is determined according to Equation 1:

$$X = L1 \cos \theta$$

$$Y = L1 \sin \theta$$

$$P = X + \sqrt{L2^2 - Y^2} \qquad \text{Equation 1,}$$

wherein X and Y are coordinates of the crank pin, L1 is a distance from the center of gyration to the crank pin, L2 is a distance from the crank pin to the piston, and P is a distance from the center of gyration to the piston.

On the contrary, the position P' of the piston in the crank shaft according to the third embodiment of the invention shown in FIG. 8 is determined according to Equation 2:

$$P = L1 \cos \theta + \sqrt{(L2^2 - L1^2 \sin \theta^2)} \qquad \text{Equation 2,}$$

wherein L1 is a distance from the center of gyration to the crank pin, L2 is a distance from the crank pin to the piston, and P is a distance from the center of gyration to the piston.

As shown in FIG. 8, L2 has a constant length without variation, whereas L1 has variation in its length due to a force applied to the springs.

The distance L1 is varied according to Equation 3:

$$L1 = Y[Fpin] \cos(\overline{\omega}t - \phi) \qquad \text{Equation 3,}$$

wherein Y and $\phi$ are the magnitude and phase angle, and $\omega$ is a angle frequency of the configured mechanism which is from damping.

In the crank shaft of the invention as set forth above, micro reciprocating movement due to the springs is added to the movement of the piston besides conventional piston movement.

As set forth above, the crank shaft according to the third embodiment of the invention is provided with the horizontal guide groove leading from the inward direction to the outward direction and the elastic means for supporting the crank pin in the guide groove. Accordingly, smooth and soft compression is enabled during compression of fluid to prevent the overpressure loss. In suction of fluid, the sucking performance is improved by using additional retreat due to the elastic means.

Therefore, the invention has an advantage that the crank shaft can efficiently obtain conversion between the rotating movement and the reciprocating movement.

What is claimed is:

1. A crank shaft for converting rotating movement into reciprocating movement of a reciprocatable element, comprising:
    a rotation shaft for inducing the rotating movement;
    a crank arm connected to said rotation shaft at the center of the crank arm and having at one side a guide groove for allowing a crank pin to move in a reciprocating manner in the guide groove in response to the rotating movement to move the reciprocatable element; and
    elastic means for elastic support of said crank pin in said guide groove.

2. The crank shaft according to claim 1, wherein said guide groove is provided leading from a first point on an inner circle formed relatively close to the center of the crank arm to a second point on an outer circle formed relatively far from the center of the crank arm.

3. The crank shaft according to claim 2, wherein said elastic means are provided at opposing sides of said crank pin.

4. The crank shaft of claim 1, wherein the crankshaft has a circular disk shape.

5. The crank shaft of claim 4, wherein the circular disk-shaped crank shaft has a U-shaped portion removed therefrom.

6. A crank shaft for converting rotating movement into reciprocating movement of a reciprocatable element, comprising:
    a rotation shaft for inducing the rotating movement;
    a crank arm connected to said rotation shaft at the center of the crank arm and having a guide groove at one side;
    a crank pin movable in a reciprocating manner in said guide groove in response to the rotating movement to move the reciprocatable element; and
    elastic means for elastic support of said crank pin in said guide groove.

7. The crank shaft according to claim 6, wherein said guide groove is provided at a distance from the center of said crank arm between the radius of an inner circle and the radius of an outer circle, both circles being centered on the center of the crank arm.

8. A crank shaft for converting rotating movement into reciprocating movement of a reciprocatable element, comprising:
    a rotation shaft for inducing the rotating movement;
    a crank arm connected to said rotation shaft at the center of the crank arm and having a guide groove at one side, said guide groove leading from a first point on an inner circle to a second point on an outer circle, both circles being centered on the center of the crank arm;
    a crank pin movable in a reciprocating manner in said guide groove in response to the rotating movement to move the reciprocatable element; and
    elastic means for elastic support of said crank pin in said guide groove.

9. The crank shaft according to claim 8, wherein said elastic means are provided at both sides of said crank pin.

10. A reciprocating compressor comprising:
    a motor for creating rotating movement;
    a crank shaft which has a rotation shaft fixedly provided in the center of said crank shaft and connected to said motor, a guide groove provided leading from an inner circle to an outer circle placed at different distances from the center of the crank shaft, elastic means for elastic support in said guide groove and a crank pin movable in a reciprocating manner in said guide groove according to the rotating direction of the rotation shaft;

a piston connected to said crank pin with an interval via a connecting rod to perform linear reciprocating movement; and a cylinder having an internal space for sucking and compressing fluid according to the linear reciprocating movement of said piston.

11. The reciprocating compressor according to claim 10, wherein said elastic means are provided at opposing sides of said crank pin.

12. The reciprocating compressor according to claim 10, wherein said crank pin is pushed outward from the center of the crank shaft in said guide groove when said piston performs linear reciprocating movement.

13. The reciprocating compressor according to claim 10, wherein said crank pin is pushed inward toward the center of the crank shaft in said guide groove while said piston performs linear reciprocating movement.

* * * * *